(12) United States Patent
Hutton

(10) Patent No.: US 7,930,458 B2
(45) Date of Patent: Apr. 19, 2011

(54) USB MEMORY CARD READER HAVING MEMORY CARD IDENTIFICATION

(75) Inventor: Henry Hutton, Tracy, CA (US)

(73) Assignee: SanDisk Corporation, Milpitas, CA (US)

( * ) Notice: Subject to any disclaimer, the term of this patent is extended or adjusted under 35 U.S.C. 154(b) by 44 days.

(21) Appl. No.: 12/273,463

(22) Filed: Nov. 18, 2008

(65) Prior Publication Data

US 2010/0125690 A1    May 20, 2010

(51) Int. Cl.
*H05K 7/10* (2006.01)
*G06F 13/14* (2006.01)
*G06F 13/36* (2006.01)

(52) U.S. Cl. ......... 710/301; 710/305; 710/306; 710/315

(58) Field of Classification Search .................. 710/301, 710/305, 306, 315
See application file for complete search history.

(56) References Cited

U.S. PATENT DOCUMENTS

| 6,425,018 | B1 * | 7/2002 | Kaganas et al. | 710/1 |
| 2005/0193162 | A1 * | 9/2005 | Chou et al. | 711/103 |
| 2006/0026350 | A1 * | 2/2006 | Lee et al. | 711/115 |
| 2008/0041951 | A1 * | 2/2008 | Adams et al. | 235/435 |

\* cited by examiner

*Primary Examiner* — Thomas J Cleary
*Assistant Examiner* — Jeremy S Cerullo
(74) *Attorney, Agent, or Firm* — Brinks Hofer Gilson & Lione

(57) ABSTRACT

A memory card reader is disclosed that includes a memory card slot adapted to allow insertion and extraction of a memory card, a universal serial bus port, and a communication controller adapted for electrical communication with a memory card in the memory card slot and the universal serial bus port. The communication controller is responsive to a command message received in a command descriptor packet at the universal serial bus port to query the memory card in the memory card slot for information uniquely identifying the memory card. The communication controller is further adapted to generate an information descriptor packet including information uniquely identifying the memory card for provision at the universal serial bus port.

13 Claims, 10 Drawing Sheets

| Offset | Field | Size | Value | Description |
|---|---|---|---|---|
| 0 | bLength | 1 | Number | Size of this descriptor in bytes (N+5) |
| 1 | bDescriptorType | 1 | Constant | Descriptor type (0xCD) |
| 2 | bDescriptorVer | 1 | Number | Revision (0x01) |
| 3 | iDescriptorIndex | 1 | Index | Index of descriptor (0xFF) |
| 4 | bNumSlots | 1 | Number | Number of slots in this reader (N) |
| 5 | bmSlotStatus[0] | 1 | Bitmap | Indicating what types of cards are supported by this slot, as well as whether there is a card presenting: |
| ... | ... | ... | ... | |
| N+4 | bmSlotStatus[N-1] | 1 | Bitmap | Bit[7]: Indicating whether a card is inserted or not<br>Bit[6..0]: Supported-card-type indicator. It is the bit-map of all card types supported by this slot, regardless of whether a card is inserted or not.<br><br>0x01: SD/MMC<br>0x02: Memory Stick<br>0x04: CF<br>0x08: (Reserved)<br>0x10: xD<br>0x20: Smart Media<br>0x40: (Reserved)<br>0x80: (Reserved) |

| Offset | Field | Size | Value | Description |
|---|---|---|---|---|
| 0 | bLength | 1 | Number | Size of this descriptor in bytes<br><br>SD: 0x66<br>MMC: 0x2A |
| 1 | bDescriptorType | 1 | Constant | Descriptor type (0xCD) |
| 2 | bDescriptorVer | 1 | Number | Revision (0x01) |
| 3 | bSlotNum | 1 | Number | Current slot number of this reader |
| 4 | bCardType | 1 | Number | Card Type:<br><br>SD 0x10<br>MMC (1-bit): 0x20<br>MMC (4-bit): 0x21<br>MMC (8-bit): 0x22 |
| 5 | bCmdStatus | 1 | Number | Get_Descriptor command status to get<br><br>*CID/CSD* and Card Status<br><br>0x00: Command Successful<br>0xFF: No response from the card |
| 6 | bCID | 16 | Bytes | *Cvard Identification (CID)* register |
| 22 | bCSD | 16 | Bytes | *Card Specific Data (CSD)* register |
| 38 | bCardStatus | 64<br>4 | Bytes | SD *(64Bytes)*: *DAT bus response to ACMD13*<br>MMC *(4Bytes)*: *RI response to CMD13* |

| Offset | Field | Size | Value | Description |
|---|---|---|---|---|
| 0 | bLength | 1 | Number | Size of this descriptor in bytes (0x66) |
| 1 | bDescriptorType | 1 | Constant | Descriptor type (0xCD) |
| 2 | bDescriptorVer | 1 | Number | Revision (0x01) |
| 3 | bSlotNum | 1 | Number | Current slot number of this reader |
| 4 | bCardType | 1 | Number | Card Type:<br><br>0x40: Memory Stick (1-bit)<br>0x41: Memory Stick PRO (4-bit)<br>0x42: Memory Stick PRO HG (8-bit) |
| 5 | bCmdStatus | 1 | Number | *INT Register of Memory Stick Spec* |
| 6 | bSystemInfo | 96 | Bytes | MS Pro: *System Information*<br>MS: *Boot & Attribute Information* |

| Offset | Field | Size | Value | Description |
|---|---|---|---|---|
| 0 | bLength | 1 | Number | Size of this descriptor in bytes (0xBE) |
| 1 | bDescriptorType | 1 | Constant | Descriptor type (0xCD) |
| 2 | bDescriptorVer | 1 | Number | Revision (0x01) |
| 3 | bSlotNum | 1 | Number | Current slot number of this reader |
| 4 | bCardType | 1 | Number | Card Type (0x60) |
| 5 | bCmdStatus | 1 | Number | *Status Register (0x177)* |
| 6 | bDriveIdentity | 184 | Bytes | Word[0..91] of data from *0xEC Command (Identify Drive)* |

| Offset | Field | Size | Value | Description |
|---|---|---|---|---|
| 0 | bLength | 1 | Number | Size of this descriptor in bytes (0x86) |
| 1 | bDescriptorType | 1 | Constant | Descriptor type (0xDC) |
| 2 | bDescriptorVer | 1 | Number | Revision (0x01) |
| 3 | bSlotNum | 1 | Number | Current slot number of this reader |
| 4 | bCardType | 1 | Number | Card Type: 0x70: xD  0x80: Smart Media |
| 5 | bCmdStatus | 1 | Number | Get_Descriptor command status to get *IDI*: 0x00: Command Successful  0xFF: No response from the card |
| 6 | bIDI | 128 | Bytes | *IDI (Identify Drive Information)* |

| Offset | Field | Size | Value | Description |
|---|---|---|---|---|
| 0 | bLength | 1 | Number | Size of this descriptor in bytes (0x05) |
| 1 | bDescriptorType) | 1 | Constant | Descriptor type (0xCD) |
| 2 | bDescriptorVer | 1 | Number | Revision (0x01) |
| 3 | bSlotNum | 1 | Number | Current slot number of this reader |
| 4 | bCardType | 1 | Number | Card Type:<br><br>0x00: No card is inserted<br>0xFF: Unknown card type |

USB MEMORY CARD READER HAVING MEMORY CARD IDENTIFICATION

BACKGROUND

1. Technical Field

The present application is directed to a memory card reader and, more particularly, to a universal serial bus memory card reader having memory card identification.

2. Related Art

A universal serial bus may be used to connect a plurality of peripheral devices to a host device, such as a personal computer or similar computing device. Such personal computing devices may be capable of processing vast amounts of data. Personal computing peripherals may add performance and functionality to the computing device.

Universal serial bus standards may be used to establish communication protocols between a universal serial bus host and peripheral components connected to the host over a universal serial bus communication channel. Communication protocols between the host and an endpoint device, as well as between the host and a hub, include the exchange of information relating to the endpoint device and/or hub.

A memory card reader is an endpoint device type that may be connected to the host over the universal serial bus. Being an endpoint device, the memory card reader may communicate standard information to the host in accordance with universal serial bus standards. Memory cards inserted into the memory card reader, however, may not constitute endpoint device types that are recognized by such standards. Hence, information uniquely identifying a memory card inserted into the memory card reader may not be available to the host system.

SUMMARY

A memory card reader is disclosed that includes a memory card slot adapted to allow insertion and extraction of a memory card, a universal serial bus port, and a communication controller adapted for electrical communication with a memory card in the memory card slot and the universal serial bus port. The communication controller is responsive to a command message received in a command descriptor packet at the universal serial bus port to query the memory card in the memory card slot for information uniquely identifying the memory card. The communication controller is further adapted to generate an information descriptor packet including information uniquely identifying the memory card for provision at the universal serial bus port.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 5 illustrates an exemplary communication packet that may be transmitted by the memory card reader in response to a general reader command.

FIG. 5 illustrates an exemplary communication packet that may be transmitted by the memory card reader in response to a general reader command.

FIG. 6 illustrates an exemplary communication packet that may be transmitted by the memory card reader in response to a card specific command.

FIG. 7 through FIG. 10 illustrate exemplary communication packets that may be transmitted by the memory card reader in response to a card specific command, where the response may be tailored to the specific card type in a queried memory card slot.

DETAILED DESCRIPTION OF THE PREFERRED EMBODIMENTS

Figure 1:
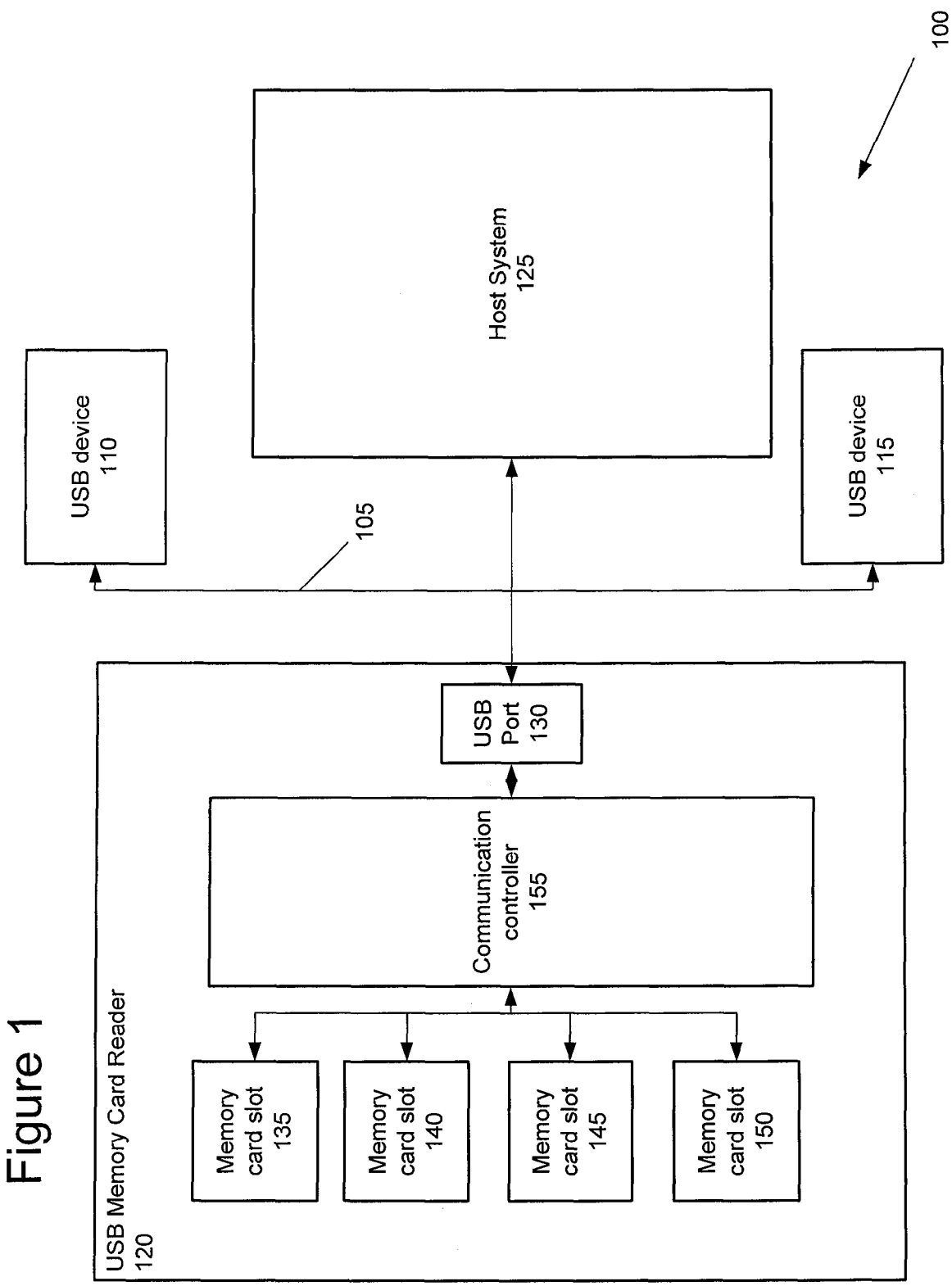
FIG. 1 is a block diagram of a system that includes a universal serial bus and corresponding components connecting a host system with a memory card reader.

FIG. 1 is a block diagram of a system 100 that includes a universal serial bus 105 and corresponding components. The universal serial bus 105 connects a first universal serial bus device 110, a second universal serial bus device 115, and a universal serial bus memory card reader 120 with a host system 125. The first and second serial bus devices 110 and 115, and the memory card reader 120 constitute endpoint devices. A universal serial bus port 130 may be used to connect the memory card reader 120 to the universal serial bus 105.

A universal serial bus standard may be used to implement communications between the endpoint devices and host system. In accordance with the universal serial bus standard, predefined communication packets may be used to exchange information between the endpoint device and the host system 125.

The memory card reader 120 may be adapted to accommodate one or more memory cards. In system 100, the memory card reader 120 includes four memory card slots 135, 140, 145, and 150. Each memory card slot 135-150 may be adapted to allow insertion and extraction of a memory card. With the insertion of a memory card into engagement with a given memory card slot 135-150, electrical communication between the memory card reader 120 and the memory card is established. When a memory card is removed from a given memory card slot 135-150, electrical communication between the memory card reader 120 and the memory card is severed.

Memory card reader 120 may also include a control interface 155. The control interface 155 is adapted for electrical communication with one or more of the memory card slots 135-150 and with the universal serial bus port 130. The control interface 155 may include hardware, software, firmware, or a combination of each to execute certain functions of the memory card reader 120. In system 100, the control interface 155 may be responsive to a command message received at the universal serial bus port 130 to query a memory card in a given memory card slot 135-150 for information uniquely identifying the memory card.

The command message may be included in a descriptor packet that is transmitted from the host system 125 and received at universal serial bus port 130. A descriptor packet, such as the GetDescriptor( ), may be used by the host system 125 to request that a universal serial bus device report its attributes to the host system 125 over the universal serial bus 105. The descriptor packet comprises a data structure with a defined format. Each descriptor packet begins with a byte-wide field that contains the total number of bytes in the descriptor packet followed by a byte-wide field that identifies the descriptor type. The command message may be provided to the universal serial bus port 130 of the card reader 125 in a string included in the descriptor packet.

When the control interface 155 executes a query request, it obtains information from the memory card that uniquely identifies the memory card. This information may include permanent information stored on the memory card. The information may be stored during the manufacturing of the memory card by the manufacturer or by any other party handling the memory card. The information may be stored using masking operations and/or through programming of the memory card. Other manners of storing information uniquely identifying the memory card may also be employed.

Once the control interface 155 has obtained the unique identification information from the memory card, the information may be provided at the universal serial bus port 130 of the card reader 120. In system 100, the control interface 155 generates a descriptor packet, such as a device descriptor packet that includes the information uniquely identifying the memory card. The information uniquely identifying the memory card may be provided in a string included in the descriptor packet (hereinafter "information descriptor packet"). The information descriptor packet is provided at the universal serial bus port 130 in response to the command message received in the descriptor packet at the universal serial bus port 130 from the host system 125.

Figure 2:
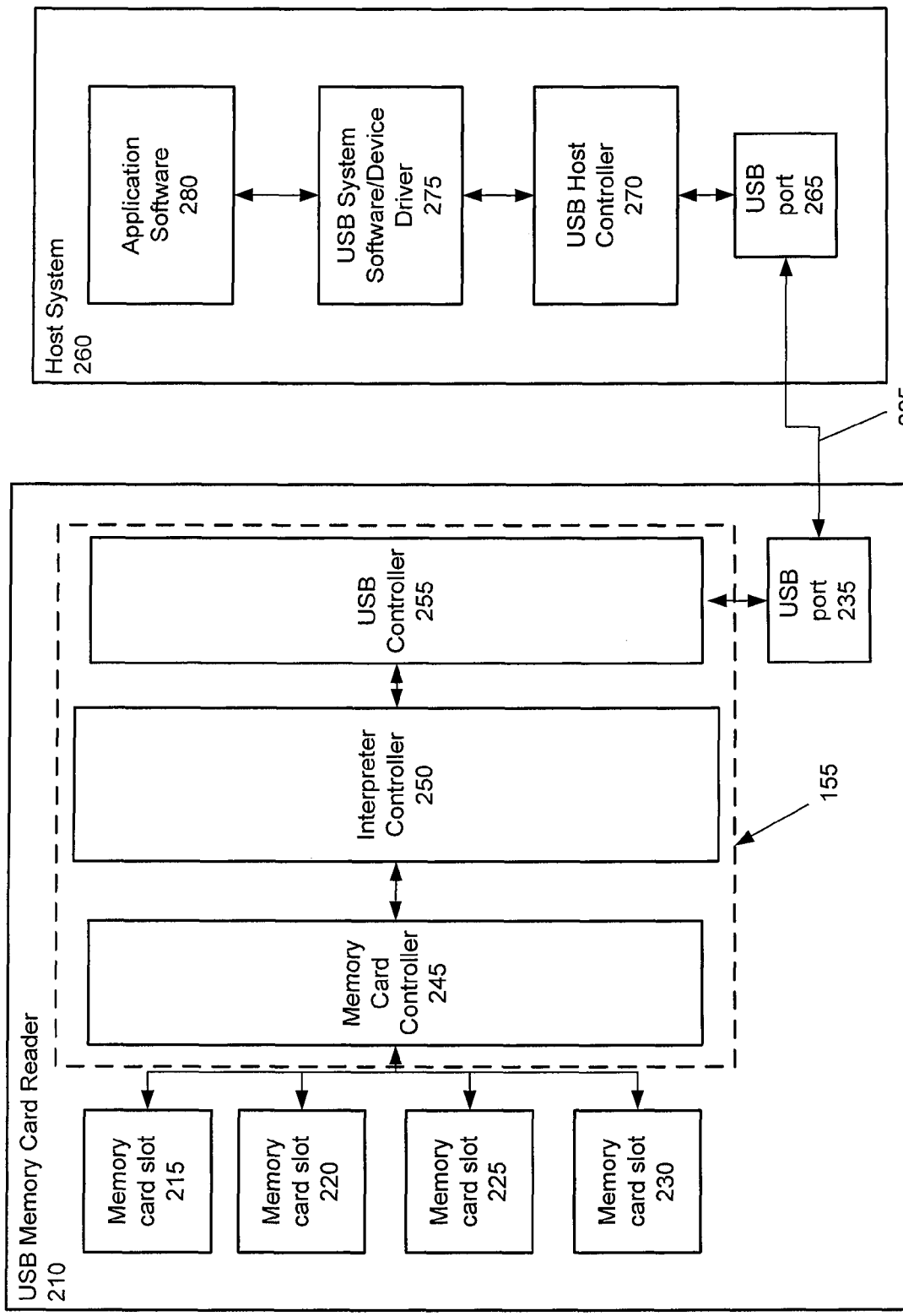
FIG. 2 is a block diagram of a further system that includes a universal serial bus and corresponding components connecting a host system with a memory card reader.

FIG. 2 shows a further system 200 that includes a universal serial bus 205 that interconnects a memory card reader 210 with a host system 215. Memory card reader 210 includes one or more memory card slots. Four memory card slots 215, 220, 225, and 230 are shown in system 200. The memory card reader 210 is connected to the universal serial bus 205 at a universal serial bus port 235. The communication controller 155 is in electrical communication with the memory card slots 215-230 as well as with the universal serial bus port 235. The communication controller 155 is responsive to a command message received in a descriptor packet at the universal serial bus port 235 to query a memory card in one or more of the memory card slots 215-230 for information that uniquely identifies the memory card. In response to the command message, the communication controller 155 generates an information descriptor packet for provision at the universal serial bus port 235. The information descriptor packet includes the information that uniquely identifies the memory card as requested in the command message.

The communication controller 155 of system 200 may include several components. In the example of FIG. 2, communication controller 155 includes a memory card controller 245, an interpreter controller 250, and a universal serial bus controller 255. The memory card controller 245 is adapted to write and read memory card data to and from memory cards disposed in each of the memory card slots 215-230. To this end, the memory card controller 245 may provide the electrical signals used to execute read and write operations for each memory card type that may be accommodated by the memory card controller 245 and corresponding memory card slots 215, 220, 225, and 230. The read and write operations executed by the memory card controller 245 are dependent on data and commands received by the memory card controller 245 from the interpreter controller 250.

The universal serial bus controller 255 is adapted for connection to the universal serial bus port 230 and may receive and send communication packets over the universal serial bus port 235. The universal serial bus controller 255 may convert data received from the interpreter controller 250 to corresponding electrical signals having signal parameters conform to the universal serial bus standard. The electrical signals are provided for transmission from the memory card reader 210 at the universal serial bus port 235. Likewise, the universal serial bus controller 255 may convert electrical signals received at the universal serial bus port 235 to corresponding data that may be used by the interpreter controller 250. The received electrical signals may have signal parameters that conform to the universal serial bus standard, while the corresponding data provided to the interpreter controller 250 may have different signal parameters.

The interpreter controller 250 is in electrical communication with the memory card controller 245 and the USB controller 255. The interpreter controller 250 is configured to communicate with the memory card controller 245 to access information that uniquely identifies a memory card in a given memory card slot 215-230. In one implementation, the interpreter controller 250 provides one or more commands to the memory card controller 245. The memory card controller 245 responds to the commands by accessing information uniquely identifying one or more memory cards disposed in the memory card slots 215-230. This information is returned to the interpreter controller 250. The interpreter controller 250 generates an information descriptor packet, which includes the unique identification information. The information descriptor packet is provided to the universal serial bus controller 255, which converts the data of the information descriptor packet to electrical signals that conform to the universal serial bus standard. These electrical signals are provided at the universal serial bus port 235 and may be transmitted on the universal serial bus 205.

FIG. 2 also illustrates an exemplary host system 260 that may communicate with the memory card reader 210. Host system 260 may include a universal serial bus port 265 that connects the host system 260 to the universal serial bus 205. A universal serial bus host controller 270 is adapted for connection to the universal serial bus port 230 and may receive and send communication packets over the universal serial bus port 265. The host controller 270 may convert data received from a universal serial bus system driver and/or universal serial bus system software 275 to corresponding electrical signals having signal parameters that conform to the universal serial bus standard. Likewise, the host controller 270 may convert electrical signals received at the universal serial bus port 265 to corresponding data that may be used by the system software/device driver 275.

Host system 260 may also include application software 280. The application software 280 may be an independent program and/or integrated with universal serial bus system software 275. Communication with the universal serial bus memory card reader 210 may be initiated by the application software 280. In one example, the software application 280 facilitates the generation of a command message that is provided in a descriptor packet (hereinafter "command descriptor packet") for transmission from the universal serial bus port 265 to the memory card reader 210. The command message provided in the command descriptor packet is configured to direct the memory card reader 210 to return an information descriptor packet to the host system 260. The information descriptor packet includes information that uniquely identifies a memory card in a memory card slot of the memory card reader 210 and is provided from the memory card reader 210 to the input of the universal serial bus port 265.

The application software 280 may use the information uniquely identifying the memory card in different manners. For example, the application software 280 may use the unique memory card identification information to control access to data stored on the memory card by a user of the host system 260. Such memory card access may include reading and/or writing of data, the ability to change the information uniquely identifying the memory card, as well as other access functionality.

Each component of the system 200 may be implemented in hardware, software, firmware, and/or a combination of such items. Although the components of communication controller 155 are shown as distinct structures, the functionality and/or implementation of a given component may overlap with the functionality and/or implementation of another component(s).

Figure 3:
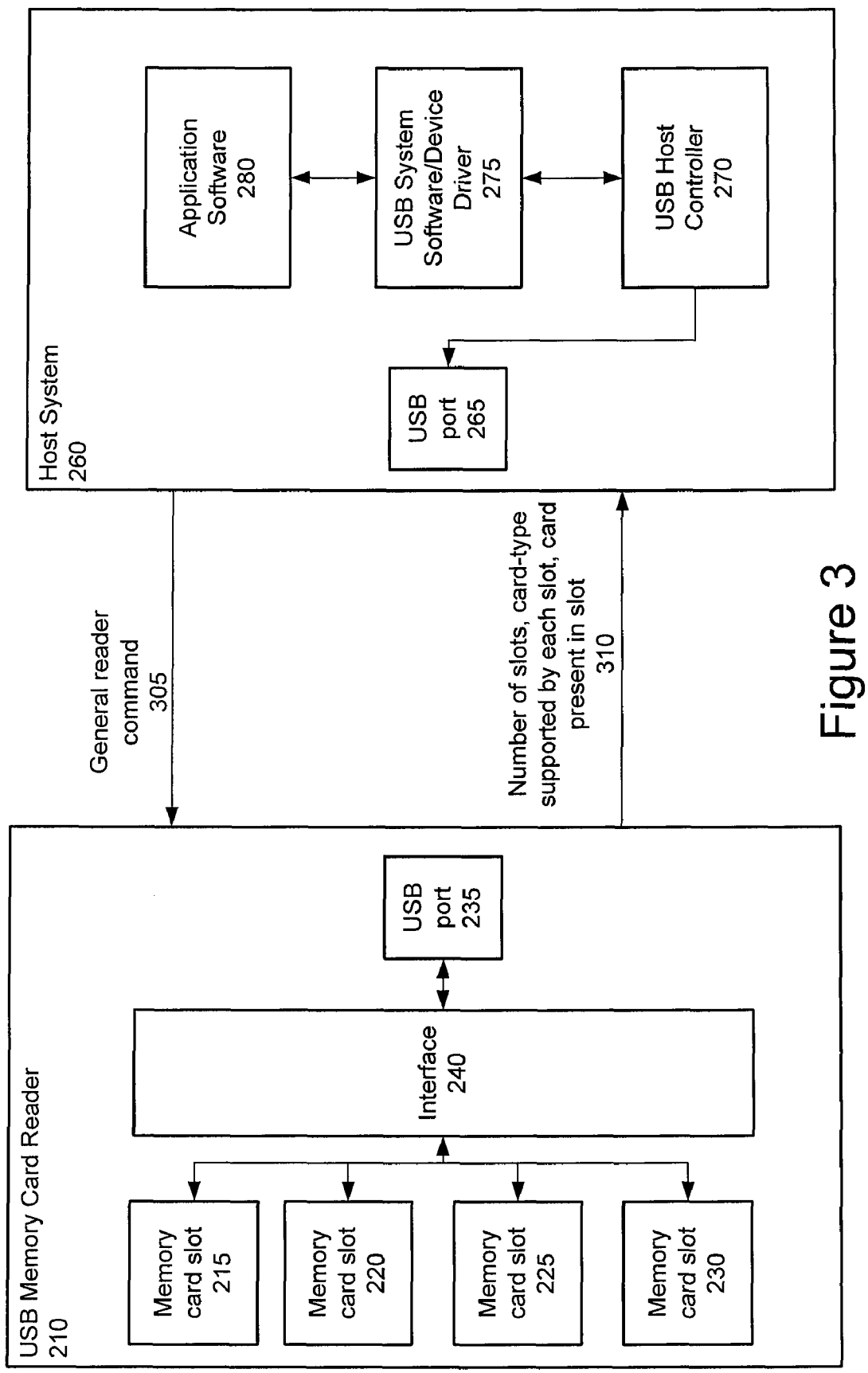
FIG. 3 illustrates communications that may be used between a universal serial bus memory card reader and a host system during a first communication phase.

Communications between the universal serial bus memory card reader 210 and host system 260 may take place in multiple phases. A two phase communication operation is shown in the examples illustrated in FIG. 3 and FIG. 4. In the first phase illustrated in FIG. 3, the host system 260 may initiate a general reader command 305. The general reader command may be initiated by the application software 280 and included in a command descriptor packet transmitted to the memory card reader 210. The host system 260 may initiate the general reader command to obtain information relating to the general configuration of the card reader 210. Since there is no standard defining which index of a descriptor packet maps to which kind of information, a unique descriptor-type may be selected to implement the general reader descriptor packet. For illustrative purposes, a descriptor value of 0xCD is used, although other descriptor-type values may also be employed. For example, a Get_Descriptor(type: 0xCD, index: 0xFF) may be used as the general reader command 305 in the command descriptor packet.

As shown at 310, the memory card reader 210 may respond to the general reader command 305 with its configuration information. The configuration information may be included in an information descriptor packet transmitted from the memory card reader 210 to the host system 260. The configuration information may include the number of slots in the memory card reader 210, the card-type supported by each slot, and/or whether a card is disposed in each of the slots. This configuration information may be provided to the application software 280 for further use in communications with the memory card reader 210.

An example of an information descriptor packet that may be transmitted by the memory card reader 210 in response to the general reader command 305 is shown in Table 500 of FIG. 5. In Table 500, the response of the memory card reader 210 to the general reader command 305 includes the following:

Byte[0] and Byte[1] correspond to the length and type of the descriptor;
Byte[2] corresponds the version of the software, firmware, and/or hardware employed by the memory card reader 210, where value 0xij corresponds to version ij;
Byte[3] may be 0xFF, the value used to get the information from the whole reader instead of an individual card.
Byte4] corresponds to the number of slots present in the memory card reader 210; and
Byte[5] to byte[N+4] may be bitmaps indicating how many card-types are supported in slot[0] to slot[N−1].

Figure 4:
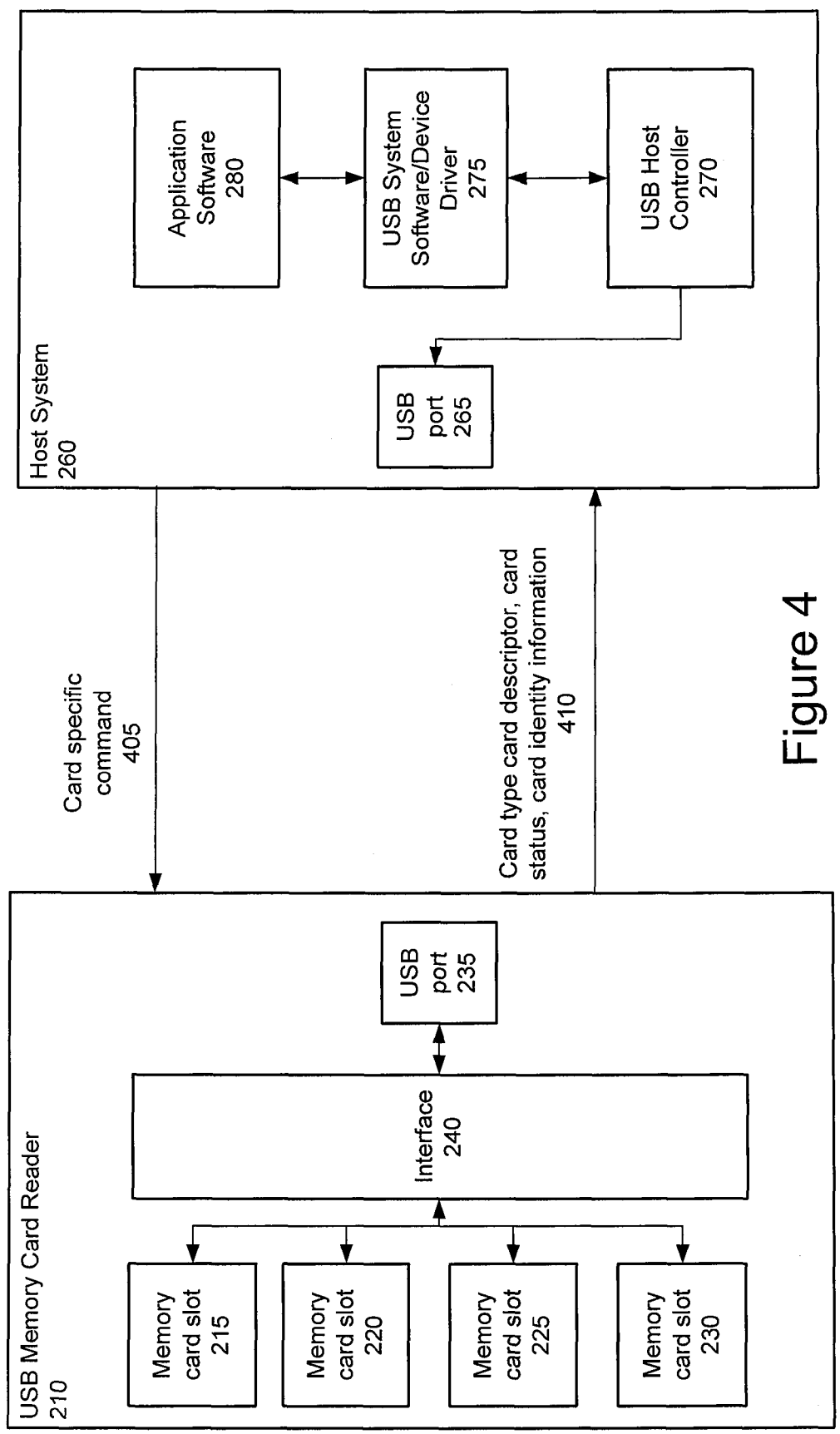
FIG. 4 illustrates communications that may be used between a universal serial bus memory card reader and a host system during a second communication phase.

A second communication phase between the memory card reader 210 and the host system 260 is shown in FIG. 4. In this example, the host system 260 provides a card specific command 405 in a command descriptor packet communicated to the memory card reader 210. The card specific command 405 may be initiated by the application software 280 based on the information obtained during the communication phase shown in FIG. 3. The card specific command 405 may be used to obtain information relating to a card that is inserted in a specific memory card slot 215-230. For example, the descriptor-index of the card specific command 405 may include the slot number associated with a particular memory card slot 215-230, which may start from 0. Assuming that memory card slot 215 has an index of 0, the host system 260 may transmit a Get_Descriptor (type: 0xCD, index: 0x00) command to the memory card reader 210 to obtain information relating to the memory card inserted in memory card slot 215.

The memory card reader 210 may respond to the card specific command 405 with an information descriptor packet that includes information relating to the memory card in the memory card slot 215-230 queried in the command descriptor packet issued by the host system 260. The returned information 410 may include the memory card type inserted in the queried slot, the description of the memory card in the queried slot, the status of the memory card in the queried slot, and the desired identity information of the memory card in the queried slot. The desired identity information of the memory card may correspond to the information stored on the memory card that uniquely identifies it. The returned information 410 may be provided to the application software 280 for further use, for example, in the manner described above.

The returned information 410 may be communicated to the host system 260 using information that is dependent on the particular type of memory card inserted in the queried memory slot 215-230. Tables corresponding to various memory card types are shown in FIGS. 6 through 10. Some information that may be common to each card type may include:

Byte[0] and Byte[1] correspond to the length and type of the descriptor;
Byte[3] corresponds the queried memory card slot index;
Byte[4] corresponds to the type of card that is inserted in the queried memory card slot. The application software 280 may use this byte to choose a proper table, such as those shown in FIGS. 6 through 10 to parse the data provided after Byte[6]. The mapping of the card-types may include:
0x00: No card is inserted
0x10: SD
0x20: MMC (1-bit)
0x21: MMC (4-bit)
0x22. MMC (8-bit)
0x40: Memory Stick (1-bit)
0x41: Memory Stick PRO (4-bit)
0x42: Memory Stick PRO HG (8-bit)
0x60: CF
0x70: xD
0x80: Smart Media
0xFF: Unknown card type
Byte[5] may correspond to the status of the Get_Descriptor command as the memory card reader 210 executes the card specific command 405 to obtain the desired identity information. The content of this byte and how to it is parsed may depend on the type of the memory card inserted in the queried memory card slot;
The remaining portions of each table may include the desired identity information. The content of it and how to parse it depend on the type of memory card inserted in the queried memory card slot 215-230.

The tables shown in FIGS. 6-10 include information that may be returned to the host system 260 when a particular memory card type is present in the queried memory card slot 215-230. Table 600 of FIG. 6 shows information that may be provided to the host system 260 when the queried memory card slot includes an SD or MMC memory card type. Table 700 of FIG. 7 shows information that may be provided to the host system 260 when the queried memory card slot includes MemoryStick® memory card type. Table 800 of FIG. 8 shows information that may be provided to the host system 260 when the queried memory card slot includes CompactFlash® memory card type. Table 900 of FIG. 9 shows information that may be provided to the host system 260 when the queried memory card slot includes a SmartMedia® or xD® memory card type. Table 1000 of FIG. 10 shows information that may be provided to the host system 260 when the queried memory card slot includes an unknown memory card type or is otherwise empty.

The methods and descriptions of the foregoing systems may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers. The memory may retain an ordered listing of executable instructions for implementing logical functions. A logical function may be implemented through digital circuitry, through source code, through analog circuitry, or through an analog source such as through an analog electrical signal.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A memory card reader comprising:
    a memory card slot adapted to allow insertion and extraction of a memory card;
    a universal serial bus port;
    a communication controller adapted for electrical communication with a memory card in the memory card slot and with a host system connected to the universal serial bus port;
    wherein the communication controller is configured to:
        receive a command message in a command descriptor packet of a universal serial bus standard communication at the universal serial bus port;
        identify the command message in the command descriptor packet and translate the command message into one or more memory card commands to query the memory card in the memory card slot for information uniquely identifying the memory cart; and
        generate an information descriptor packet including information uniquely identifying the memory card and information on memory card type of the queried memory card for transmission via the universal serial bus port in a universal serial bus standard communication.

2. The memory card reader of claim 1, wherein the information uniquely identifying the memory card comprises permanent information stored on the memory card by a manufacturer of the memory card.

3. The memory card reader of claim 1, wherein the communication controller comprises:
    a memory card controller adapted to read and write memory card data;
    a universal serial bus controller adapted for connection to the universal serial bus port; and
    an interpreter controller in communication with the memory card controller and the universal serial bus controller, wherein the interpreter controller is adapted to communicate with the memory card controller to access information uniquely identifying the memory card and to communicate with the universal serial bus controller to provide information uniquely identifying the memory card for communication in the information descriptor packet provided to the universal serial bus port.

4. The memory card reader of claim 3, wherein the interpreter controller is adapted to communicate with the universal serial bus controller to identify the command message in the command descriptor packet received at the universal serial bus port.

5. The memory card reader of claim 1, wherein the memory card reader further comprises:
    a plurality of memory card slots adapted to allow insertion and extraction of a plurality of memory cards; wherein the communication controller is adapted to communicate with a memory card in each of the plurality of memory card slots; and
    wherein the communication controller is responsive to a further command message received in a command descriptor packet from a host system over the universal serial bus port to generate a further information descriptor packet including memory card reader configuration information for communication to the universal serial bus port.

6. The memory card reader of claim 5, wherein the memory card reader configuration information comprises how many memory card slots are provided in the memory card reader.

7. The memory card reader of claim 5, wherein the memory card reader configuration information comprises what type of memory card is supported by each memory card slot.

8. The memory card reader of claim 5, wherein the memory card reader configuration information comprises identification of which memory card slots have memory cards.

9. A memory card reader comprising:
a plurality of memory card slots adapted to allow insertion and extraction of a plurality of memory card types;
a universal serial bus port adapted to provide electrical connection with a universal serial bus;
a communication controller in electrical communication with memory cards in the plurality of memory card slots and in electrical communication with the universal serial bus port;
wherein the communication controller is responsive to a first command message received in a command descriptor packet at the universal serial bus port to provide a first information descriptor packet to the universal serial bus port;
wherein the first information descriptor packet includes general memory card reader characteristics including a number of the plurality of memory card slots, a type of memory card supported by each of the plurality of memory card slots, and whether a memory card is disposed in each of the plurality of memory card slots; and
wherein the communication controller is responsive to a second command message received in a command descriptor packet in a universal serial bus communication at the universal serial bus port to:
  identify the second command message in the command descriptor packet and translate the command message into one or more memory card commands to query a memory card in a memory card slot of the plurality of memory card slots for information uniquely identifying the memory card; and
  generate a second information descriptor packet including information uniquely identifying the memory card for transmission via the universal serial bus port in a universal serial bus communication.

10. The memory card reader of claim 9, wherein the information uniquely identifying the memory card comprises permanent information stored on the memory card by a manufacturer of the memory card.

11. A method for operating a memory card reader comprising:
receiving a command message in a command descriptor packet of a universal serial bus communication at a universal serial bus port of a memory card reader; and
the memory card reader responding to the command message in the command descriptor packet by:
  identifying the command message in the command descriptor packet and translating the command message into one or more memory card commands to query a memory card in a memory card slot of the memory card reader for information uniquely identifying the memory card; and
  generating an information descriptor packet including information uniquely identifying the memory card for transmission via the universal serial bus port in a universal serial bus communication.

12. The method of claim 11, wherein the information uniquely identifying the memory card comprises permanent information stored on the memory card by a manufacturer of the memory card.

13. The method of claim 11, further comprising:
receiving a further command message in a further command descriptor packet at the universal serial bus port;
responding to the further command message in the further command descriptor packet by providing a further information descriptor packet at the universal serial bus port having information relating to general characteristics of the memory card reader, wherein the general characteristics include a number of memory card slots included in the memory card reader, a type of memory card supported by each memory card slot, and whether a memory card is disposed in each memory card slot.

* * * * *

UNITED STATES PATENT AND TRADEMARK OFFICE
CERTIFICATE OF CORRECTION

| | | |
|---|---|---|
| PATENT NO. | : 7,930,458 B2 | Page 1 of 1 |
| APPLICATION NO. | : 12/273463 | |
| DATED | : April 19, 2011 | |
| INVENTOR(S) | : Henry Hutton | |

It is certified that error appears in the above-identified patent and that said Letters Patent is hereby corrected as shown below:

In the Claims

Column 8, claim 1, line 13, after "identifying the memory" replace "cart" with --card--.

Signed and Sealed this
Fourteenth Day of June, 2011

David J. Kappos
*Director of the United States Patent and Trademark Office*